(12) United States Patent
Hellandbrand, Jr. et al.

(10) Patent No.: US 7,668,280 B2
(45) Date of Patent: Feb. 23, 2010

(54) NUCLEAR FUEL ASSEMBLY

(75) Inventors: Patrick A. Hellandbrand, Jr., East Hartford, CT (US); Richard P. Broders, Granby, CT (US)

(73) Assignee: Westinghouse Electric Co LLC, Cranberry Township, PA (US)

(*) Notice: Subject to any disclaimer, the term of this patent is extended or adjusted under 35 U.S.C. 154(b) by 279 days.

(21) Appl. No.: 11/591,328

(22) Filed: Nov. 1, 2006

(65) Prior Publication Data
US 2008/0137799 A1 Jun. 12, 2008

(51) Int. Cl.
G21C 3/32 (2006.01)
G21C 17/00 (2006.01)

(52) U.S. Cl. .................. 376/254; 376/434; 376/245

(58) Field of Classification Search ............... 376/254
See application file for complete search history.

(56) References Cited

U.S. PATENT DOCUMENTS

| | | | | |
|---|---|---|---|---|
| 3,105,037 A | * | 9/1963 | Weems | 376/454 |
| 4,751,039 A | * | 6/1988 | Delevallee et al. | 376/261 |
| 4,814,138 A | * | 3/1989 | Fick et al. | 376/463 |
| 4,839,135 A | * | 6/1989 | Merkovsky | 376/254 |
| 4,990,304 A | * | 2/1991 | Rylatt | 376/434 |
| 5,265,138 A | * | 11/1993 | DeMario et al. | 376/434 |
| 6,636,578 B1 | * | 10/2003 | Clark | 376/261 |

* cited by examiner

Primary Examiner—Jack W. Keith
Assistant Examiner—Erin M Boyd

(57) ABSTRACT

A nuclear fuel assembly having an instrumentation tube having an insert that centers the in-core instrumentation while permitting bugling or welding of the instrumentation tube wall to a grid strap to obtain a rigid connection there between at any elevation along the instrumentation tube.

11 Claims, 5 Drawing Sheets

NUCLEAR FUEL ASSEMBLY

BACKGROUND OF THE INVENTION

1. Field of the Invention

This invention pertains in general to nuclear reactor fuel assemblies and more particularly to a pressurized water reactor nuclear fuel assembly instrumentation thimble.

2. Background

A typical pressurized water reactor includes a reactor vessel which contains nuclear fuel, a coolant, typically a water based solution, which is heated by the nuclear fuel, and means for monitoring and controlling the nuclear reaction. The reactor vessel is cylindrical, and is provided with a hemispherical bottom and a hemispherical top which is removable. The hot water coolant solution is conveyed from and returned to the vessel by a reactor coolant system which includes one or more reactor coolant loops (usually three or four loops, depending upon the power generating capacity of the reactor). Each loop includes a pipeline to convey hot water from the reactor vessel to a steam generator, a pipeline to convey the water from the steam generator back to the reactor vessel, and a pump. The steam generator is essentially a heat exchanger which transfers heat from the reactant coolant system to water from a source that is isolated from the reactor coolant system; the resulting steam is conveyed to a turbine to generate electricity. During operation of the reactor, the water in the vessel and coolant system is maintained at a high pressure to keep it from boiling as it is heated by the nuclear fuel.

Nuclear fuel is supplied to the reactor in the form of a number of fuel assemblies, that are supported within a reactor core by upper and lower traversely extending core support plates. Conventional designs of fuel assemblies include a plurality of fuel rods and control rod guide thimbles which are hollowed tubes held in an organized array by grids spaced along the fuel assembly length and attached to the control rod guide thimbles. The guide thimbles are structural members which also provide channels for neutron absorber rods, burnable poison rods or neutron source assemblies which are all vehicles for controlling the reactivity of the reactor. Top and bottom nozzles on opposite ends thereof are secured to the guide thimbles; thereby forming an integral fuel assembly.

The grids, as is known in the relevant art, are used to precisely maintain the spacing between the fuel rods in the reactor core, resist rod vibration, provide lateral support for the fuel rods and, to some extent, vertically restrain the rods against longitudinal movement. One type of conventional grid design includes a plurality of interleaved straps that together form an egg-crate configuration having a plurality of roughly square cells which individually accept the fuel rods therein. Depending upon the configuration of the control rod guide thimbles, the guide thimbles can either be received in cells that are either sized the same as those that receive the fuel rods therein, or can be received in relatively larger thimble cells defined in the interleaved straps. Typically at least one instrumentation tube is provided that extends through at least one cell, typically the center cell, in each strap and is captured between the top and bottom nozzles. The instrumentation tube, like the control rod guide thimbles, is attached to each of the grid cells through which it passes by a mechanical connection formed by bulging or welding. A number of measuring instruments are employed within the reactor core to promote safety and to permit proper control of the nuclear reaction. Among other instruments, neutron flux detectors are stationarily positioned within the instrumentation tubes within the core for that purpose. For a proper flux reading of the neutron activity within the region of the corresponding fuel assembly it is important that the flux detectors be centrally positioned around the longitudinal axis of the instrumentation tube. Centering of the in-core instrumentation is required to ensure the detector responses are consistent from location to location within the core. One existing instrumentation tube design is illustrated in FIG. 1. FIG. 1 shows the instrumentation tube 10 extending between the upper or top nozzle 12 and the bottom nozzle 14. An in-core instrument 16 extends through the interior of the instrument tube 10 spanning between the top nozzle 12 and lower or bottom nozzle 14. Dimples 18 formed by crimping the instrumentation tube at a number of diametrically opposed points around its circumference, center the in-core instrumentation 16 within the tube 10. Typically the dimples are provided at a number of elevations along the instrumentation tube 10, with subsequent dimples being rotated 90 degrees as shown in the top section of the instrumentation tube 10 shown in FIG. 2. However the dimples preclude the bulging of the instrumentation tube to a spacer grid at the dimple elevations and also are limited in their ability to center smaller outside diameter in-core instrumentation within the instrumentation tube.

Accordingly, a new instrumentation tube design is desired that will center the in-core instrumentation while providing a smooth wall, non dimpled, outside circumference that may be either welded or bulged to the spacer grids.

Furthermore, it is an object of this invention to provide such an in-core instrumentation tube that can center any size in-core instrumentation within the instrumentation tube.

SUMMARY OF THE INVENTION

The foregoing objects are achieved by an improved nuclear fuel assembly having a top nozzle, a bottom nozzle and a plurality of elongated control rod guide thimbles respectively attach at a first end to the top nozzle and at a second end to the bottom nozzle. A plurality of elongated fuel rods supporting fissile material there within extend parallel to the control rod guide thimbles, between the top nozzle and the bottom nozzle. A plurality of traversed grids are arranged in a spaced tandem array between the top nozzle and the bottom nozzle. The grids respectively form a lattice to latterly support the fuel rods in a spaced orderly array. The grids are attached to and are supported axially by the control rod guide thimbles. At least one elongated instrumentation tube extends and is captured between the top nozzle and the bottom nozzle. The control rod guide thimbles, fuel rods and the instrumentation tube have parallel axes extending along their elongated dimension. The instrumentation tube is adapted to receive an in-core instrumentation that extends along a substantial axial length of the instrumentation tube. The in-core instrumentation remains fixed during reactor operation. An instrumentation tube insert extends within and substantially along the elongated dimension of the instrumentation tube. The insert has an inside narrow most diameter at a plurality of axial locations along the length of the insert that closely approximates the outside diameter of the in-core instrumentation so as to maintain the in-core instrumentation centered in the instrumentation tube. The inside narrow most diameter is supported at a fixed distance from an inside diameter of the instrumentation tube at spaced segmented locations along the interior of the instrumentation tube. The insert is adaptable to center in-core instrumentation with the smallest practical outside diameter without substantially increasing the neutron capture cross section of the instrumentation tube.

In one embodiment the insert is a spiral spring that has an outside diameter that closely matches the inside diameter of the instrumentation tube and an inside diameter that substantially closely matches the outside diameter of the in-core instrumentation. Desirably the spring has a closed pitch at each end and an appropriate pitch to preclude snagging of the In-Core Instrument, e.g., a pitch of approximately 1" (2.54 cm), in an intermediate region below and above both end portions of the spring. In another embodiment, the inside diameter of the spring circumscribes the outside diameter of an instrumentation thimble tube that has an inside diameter which substantially matches the outside diameter of the in-core instrumentation. The instrument thimble tube extends within the spring spanning the length of the instrumentation tube. In another embodiment the instrumentation thimble tube is flared outward at its lower end towards the wall of the instrumentation tube to retain the spring between the instrument thimble tube and the instrumentation tube.

In another embodiment the insert has an oval cross section at a plurality of locations along its axial dimension. The major outside diameter of the oval cross section approximates the inside diameter of the instrumentation tube and the minor inside diameter of the oval cross section substantially approximates the outside diameter of the in-core instrumentation. Desirably, the oval cross section is rotated relative to the axis of the instrumentation tube at different elevations along the axial length of the instrumentation tube. Desirably, the rotation is 90 degrees between adjacent oval cross sections.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 3:
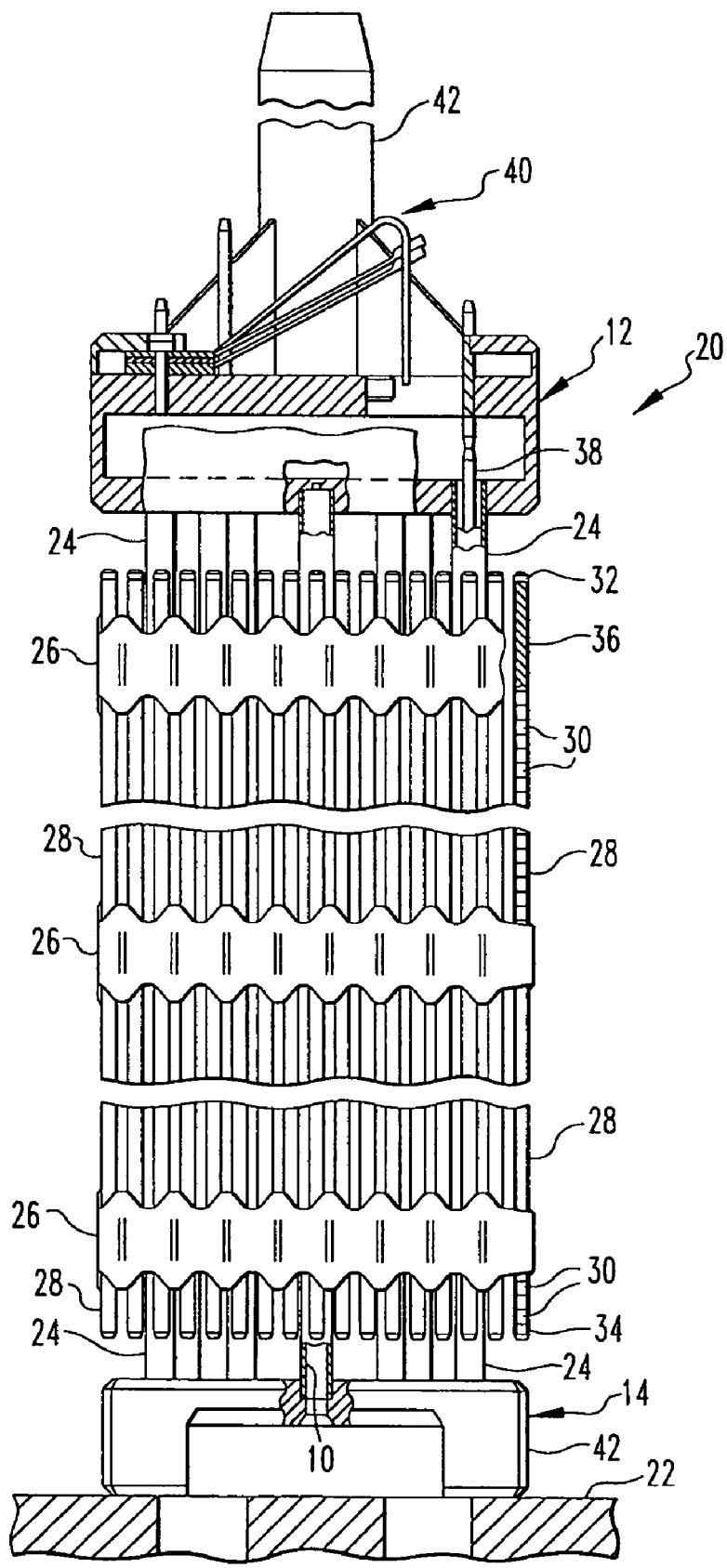
FIG. 3 is an elevational view, partially in section, of a fuel assembly in which is incorporated the preferred embodiment of the instrument tube of the present invention, the assembly being illustrated in vertically shorten form, with parts broken away for clarity.

Referring now to the drawings and particularly to FIG. 3, there is shown an elevational view of a nuclear reactor fuel assembly, represented in vertically shorten form and being generally designated by reference character 20. The fuel assembly 20 is the type used in a pressurized water reactor and has a structural skeleton which, at its lower end, includes a bottom nozzle 14. The bottom nozzle 14 supports the fuel assembly 20 on a lower core support plate 22 in the core region of the nuclear reactor (not shown). In addition to the bottom nozzle 14, the structural skeleton of the fuel assembly 20 also includes a top nozzle 12 at its upper end and a number of guide tubes or thimbles 24, which extend longitudinally between the bottom and top nozzles 14 and 12 and at the opposite ends are rigidly attached thereto.

The fuel assembly 20 further includes a plurality of traverse grids 26, that are axially spaced along, and mounted to, the guide thimble tubes 24 and an organized array of elongated fuel rods 28 traversely spaced and supported by the grids 26. Also, the fuel assembly 20 includes an instrumentation tube 10 located in the center thereof, which extends and is captured between the bottom and top nozzles 14 and 12. With such an arrangement of parts, fuel assembly 20 forms an integral unit capable of being conveniently handled without damaging the assembled parts.

As mentioned above, the fuel rods 28 in the array shown in the assembly 20 are held in space relationship with one another by the grids 26 spaced along the fuel assembly length. Each fuel rod 28 includes nuclear fuel pellets 30 and is closed at its opposite ends by upper and lower end plugs 32 and 34. The pellets 30 are maintained in a stack by plenum spring 36 dispose between the upper end plug 32 and the top of the pellet stack. The fuel pellets 30, composed of a fissel material, are responsible for creating the reactive power of the reactor. A liquid moderator/coolant such as water or water containing boron, is pumped upwardly through a plurality of flow openings in the lower core plate 22 to the fuel assembly. The bottom nozzle 14 of the fuel assembly 20 passes the coolant upwardly through the guide tubes 24 and along the fuel rods 28 of the assembly in order to extract heat generated therein for the production of useful work.

To control the fission process, a number of control rods 38 are recipically movable in the guide thimbles 24 located at predetermined positions in the fuel assembly 20. Specifically, a rod cluster control mechanism 40 positioned above the top nozzle 12 supports the control rods 38. The control mechanism has an internally threaded cylindrical member 42 which functions as a drive rod, with a plurality radially extending flukes or arms 44. Each arm 44 is interconnect to control rod 38 such that the control rod mechanism 40 is operable to move the control rods vertically in the guide thimbles 24 to thereby control the fission process in the fuel assembly 20, all in a well known manner.

Figure 1:
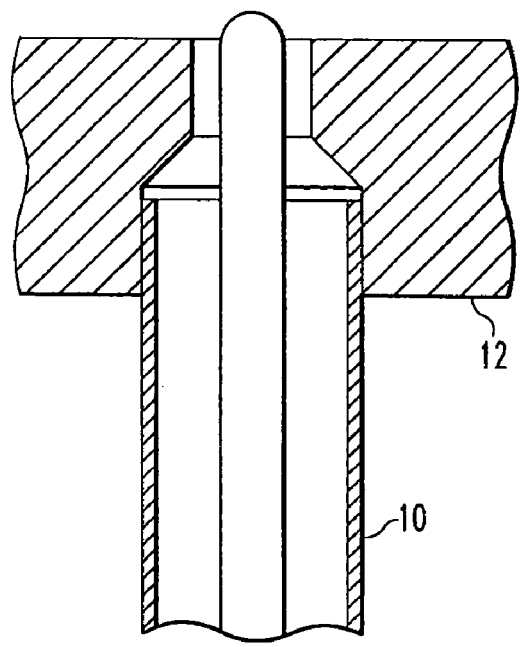
FIG. 1 is a sectional view of a prior art instrumentation tube supported between the top nozzle and bottom nozzle of a pressurized water reactor fuel assembly.
Figure 1:
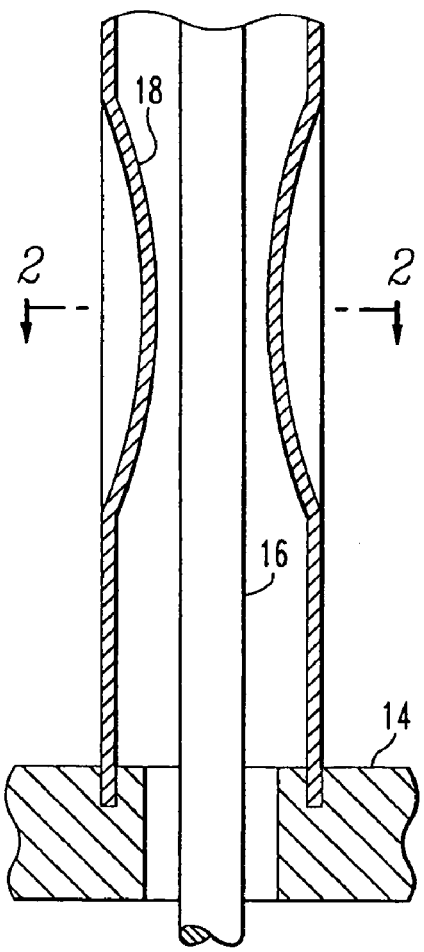
Figure 2:
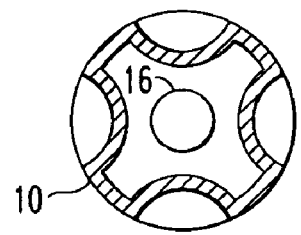
FIG. 2 is a cross sectional view of FIG. 1 taken at an elevation above two orthogonal pairs of dimples.

The grids 26 are mechanically attached to the control rod guide thimbles 24 and the instrumentation tube 10 by welding, or preferably by bulging. Bulging is particularly desirable where welding dissimilar materials is difficult. As previously mentioned with regards to FIG. 1 the prior art configuration for centering the in-core instrumentation employing dimples made it difficult to fasten the instrumentation tube 10 to the grids 26 at the dimple elevations. This was particularly true at the lower most grid 26. This invention overcomes this difficulty by providing a smooth wall instrumentation tube that can be readily welded or bulged to make a rigid connection with the grid strap while retaining the capability of centering the in-core instrumentation within the instrumentation tube as will be explained hereafter.

Figure 4:
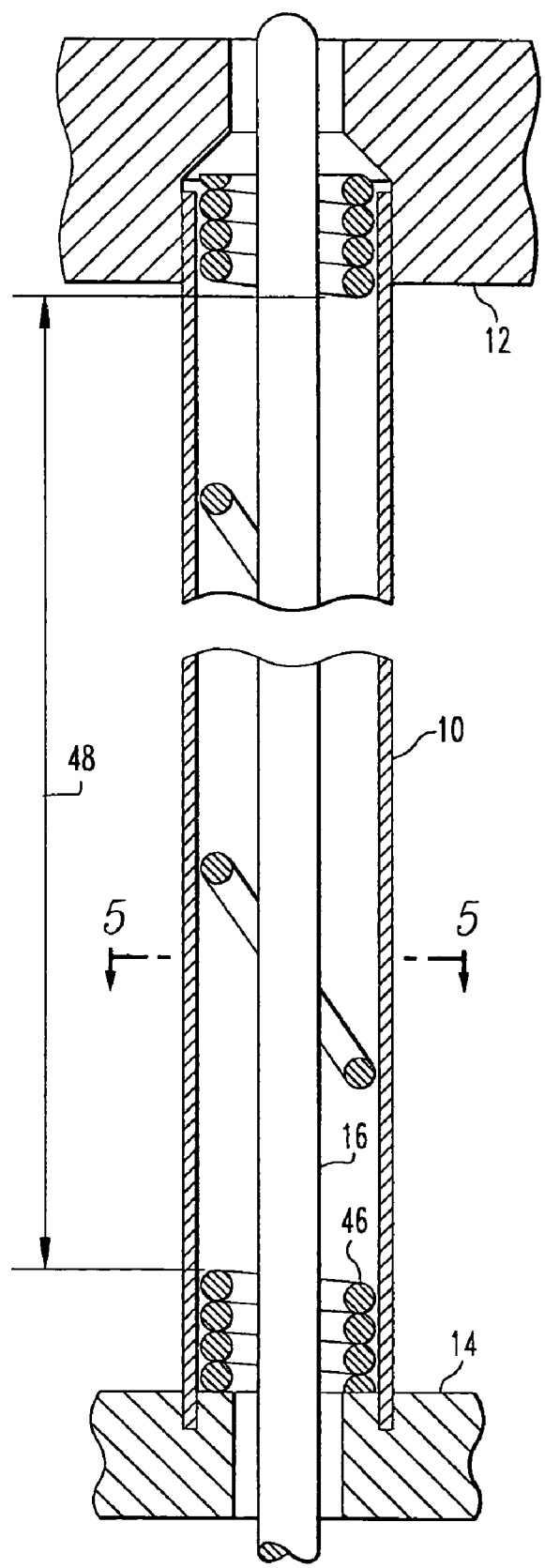
FIG. 4 is a sectional view of an instrument tube of one embodiment of this invention captured between a section of the top nozzle and bottom nozzle of a pressurized water reactor fuel assembly.
Figure 5:
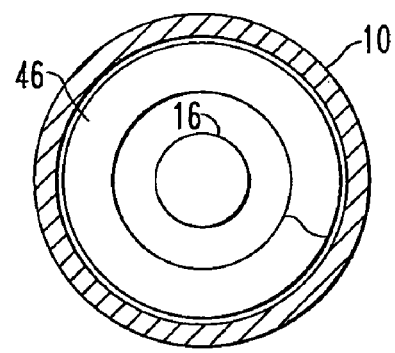
FIG. 5 is a cross sectional view of FIG. 4 taken approximately along the mid section of the instrument tube.

A first preferred embodiment of this invention is illustrated in FIG. 4. In accordance with this invention a smooth wall instrumentation tube 10 is provided. In this example an instrumentation tube having an inside diameter of 0.900 inch (2.29 cm) is employed though it should be appreciated that the size of the instrumentation tube may vary from reactor to reactor without impacting on the concept of this invention. A coiled thimble spring 46 is closely received within the inside diameter of the instrumentation tube 10. The thimble spring 46 preferably spans the elongated axial dimension of the instrument tube 10 and is captured between the bottom nozzle 14 and the top nozzle 12. In this example the thimble spring 46 preferably has an outside diameter of 0.860 inch (2.18 cm) and the spring wire diameter is 0.156 inch (0.40 cm). The dimensions of the thimble spring 46 may vary without detracting from the concept of this invention so long as the thimble spring is sized to center the in-core instrument. By being "centered" it means that the in-core instrument centering devices, i.e., the thimble springs, are sized to limit radial movement of the in-core instrument within the instrument tube 10, such that, the functional criterion for the in-core instrument is satisfied. Desirably, the spring has a closed pitch at each end, i.e., adjacent spiral coil turns approximately touch, and a larger pitch, e.g.,1 inch (2.54 cm) pitch, in the central axial region 48, i.e., the coil repeats a 360 degree rotation every pitch of axial length along the instrumentation tube. The size of the pitch may vary and is selected so as to preclude snagging of the In-Core Instrument. The in-core instrumentation 16 is received within the annular, central opening of the thimble spring 46 and spans between the fuel assembly top nozzle 12 and bottom nozzle 14. The diameter of the spring can be changed to accommodate different size in-core instrumentation. Thus, employing the concept of this invention, the walls of the instrumentation tube 10 can be bulged to create a mechanical connection with the grid strap without adversely affecting the centering of the in-core instrumentation. Preferably, the bulging occurs on portions of the inner circumference of the instrumentation tube 10 where the spring is not located or, the bulging process can be performed before the spring is inserted. FIG. 5 is a cross section taken along the mid span of the instrumentation tube 10 that shows the relevant positioning of the instrument tube walls and spring relative to the in-core instrumentation 16. Preferably, the instrument tube is constructed from zircaloy and the spring is construction from stainless steel though it should be appreciated that other reactor core materials may similarly be employed, i.e., relatively high temperature materials having a relatively low neutron capture cross-section that can withstand the reactor core environment.

Figure 6:
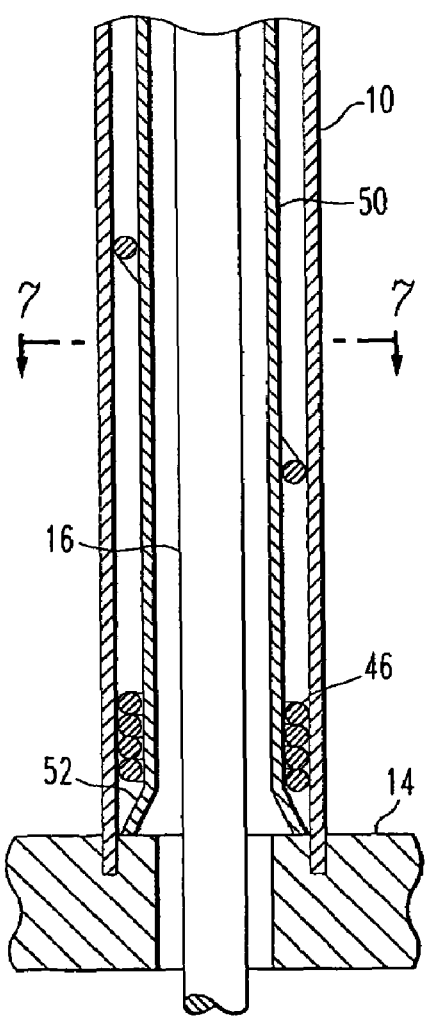
FIG. 6 is a sectional view of an instrument tube captured between the top nozzle and bottom nozzle illustrating a second embodiment of this invention.
Figure 7:
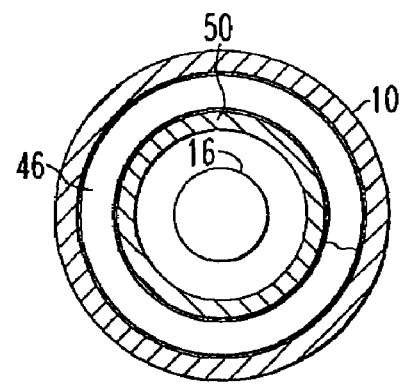
FIG. 7 is a cross sectional view of FIG. 6 taken approximately at mid plane along the longitudinal length of the instrumentation tube.

A second embodiment, which is a variation on the embodiment just described with regards to FIGS. 4 and 5 is illustrated in FIGS. 6 and 7. Like reference characters are used for the corresponding components between the two embodiments, though it should be appreciated that the dimensions of some of those components may vary from one embodiment to the other. As stated previously the dimensions are provided merely as an example and are not critical so long as the foregoing criteria are satisfied. The embodiment shown in FIG. 6 includes the same smooth walled instrument tube with an inside diameter of 0.900 inches (2.29 cm) and an outside diameter of 0.980 inches (2.49 cm) that is captured between the top nozzle 12 and bottom nozzle 14 as previously stated with regard to the embodiment shown in FIG. 4. A thimble spring 46 is closely received within the instrumentation tube 10 with a closed pitch at either end and a larger pitch, e.g., 1 inch pitch in the intermediate region as mentioned previously. The spring shown in FIG. 6 has a slightly smaller outside diameter of 0.848 inches (2.15 cm), but as previously mentioned that is not critical. A thimble tube 50 is closely received within the annular opening of the spring and spans the axial length of the instrumentation tube 10 from the top surface of the bottom nozzle to the top end of the instrumentation tube received within the top nozzle 12. The thimble tube is flared at its lower end 52 and captures the thimble spring 46 between the outside surface of the thimble tube 50 and the interior surface of the instrument tube 10. The thimble tube is sized to center the in-core instrument, e.g., an inside diameter of 0.552 inch (1.40 cm) and an outside diameter of 0.626 inch (1.59 cm). The thimble spring 46 is in close proximity to the inner wall of the instrument tube 10 and acts as a spacer between the instrument tube 10 and the thimble tube 50. The thimble tube 50 provides the guide path for the in-core instrumentation 16, which is inserted into the fuel assembly instrument tube 10 from the bottom of the reactor before operation of the reactor is started and is withdrawn before the fuel assembly is moved. In one embodiment the in-core instrumentation thimble assembly 50 is captured between the top and bottom nozzles 12, 14 and may be retained in the instrument tube 10 by preloaded the thimble spring 46 within the instrument tube 10. The thimble tube 50 and thimble spring 46 may be sized to accommodate any size in-core instrumentation. The dimples in the prior art instrument tube previously employed for centering the in-core instrumentation are at their limit and can only center the larger outside diameter designed in-core instruments. Thus, the improvement of this invention can center in-core instruments over any outside diameter range that can be accommodated by the inside diameter of the instrumentation tube and can operate with both bulged and welded instrument tube to fuel rod spacer grid connections.

Figure 8B:
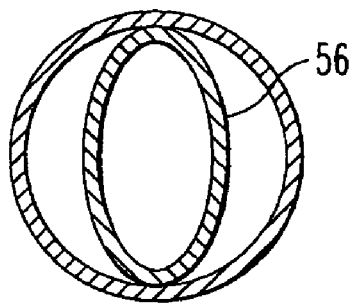
FIGS. 8a, 8b and 8c are schematic views of a third embodiment of the instrumentation tube of this invention.
Figure 8C:
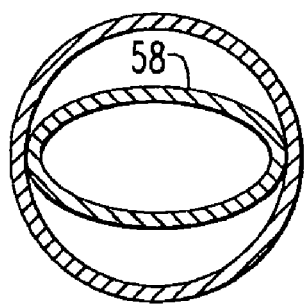
Figure 8A:
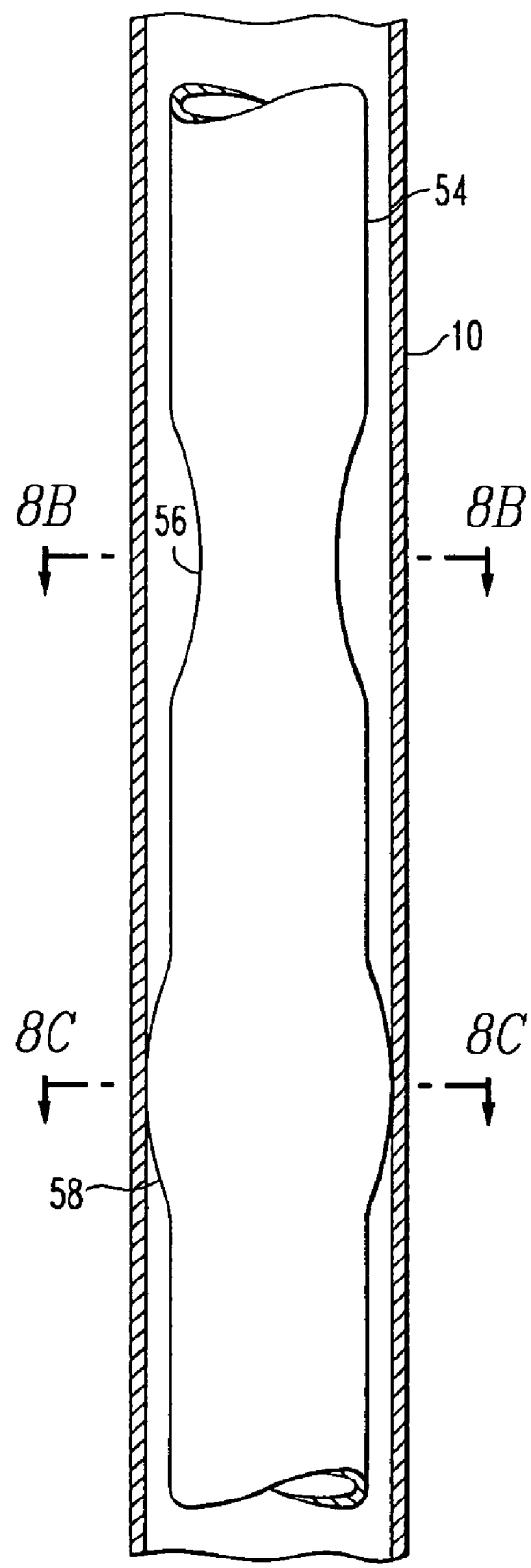

A third embodiment of this invention is illustrated in FIG. 8 and employs an alignment tube 54 that is inserted into a smooth, non dimpled, instrumentation tube 10. The alignment tube 54 contains pairs of ovalized regions 56, 58 that are oriented orthogonally to one another, thereby locally reducing the effective inside diameter (the minor diameter) of the tube 54. The ovalized tube 54 can center the smaller diameter in-core instruments as well as support the preferred bulged instrument tube-to-spacer grid connection. The ovalized regions 56, 58, shown in cross section in FIGS. 8b and 8c, perform the function previously served by the dimples in the prior art instrument tube, i.e., center the in-core instrument within the instrumentation tube. The outside and inside diameters of the alignment insert tube 54 is selected such that when ovalized, the major outside diameter of the oval region would center the tube within the instrumentation tube while the minor diameter would center the in-core instrumentation which is inserted within the alignment tube 54. As with the prior art dimpled design, the use of orthogonal pairs of ovalized sections limits the positioning of the in-core instruments in both orthogonal directions.

Use of the ovalized tube offers two distinct advantages over the current dimple design; in that the non dimpled instrumentation tube 10 is compatible with both bulging and welding for attaching the grids 26 to guide thimble tubes 24 and the ovalized tube concept is compatible with smaller in-core instrumentation diameters than can be accommodated by a dimpled instrumentation tube, due to material deformation limitation of the dimples. The ovalization approach does not suffer from the material limitation since the ovalization process induces significantly less strain in the tube for a given effective diameter than the dimple tube concept. Orthogonally oriented pairs of ovalized regions 56, 58 could be located on the same spacing as the current dimples, However, the spacing is not restricted by the spacer grid locations as the dimples are, so there is added flexibility in spacing the ovalized regions.

Securing the ovalized alignment tube 54 within the instrumentation tube 10 could be accomplished in a variety of ways including bugling the two tubes together at the top or the bottom, threading the ovalized tube to the lower end fitting via an end plug, or preloading the tube against the top and bottom nozzles with a helical spring which is also contained within the instrumentation tube 10.

Accordingly, a number of embodiments have been described, in accordance with this invention, that enable centering of in-core instruments of the narrow-most practical diameter while still enabling a rigid connection between the grid straps and the instrumentation tube by bugling or welding. While the specific embodiments have been described in detail it should be appreciated by those skilled in the art that various other modifications and alternatives to those details could be developed in light of the overall teachings of the disclosure. Accordingly, the particular embodiments disclosed are meant to be illustrative only and not limiting as to the scope of the invention, which is to be given the full breath of the appended claims and any and all equivalence thereof.

What is claimed is:

1. A nuclear reactor fuel assembly comprising:
   a top nozzle;
   a bottom nozzle;
   a plurality of elongated control rod guide thimbles respectively attached at a first end to the top nozzle and at a second end to the bottom nozzle;
   a plurality of elongated fuel rods supporting fissile material there within, the fuel rods extending parallel to the control rod guide thimbles, between the top nozzle and the bottom nozzle;
   a plurality of transverse grids arranged in a spaced tandem array between the top nozzle and the bottom nozzle, the grids respectively forming a lattice to latterly support the fuel rods in a spaced orderly array, the grids being attached to and supported axially by the control rod guide thimbles;
   at least one elongated instrumentation tube extending and captured between the top nozzle and the bottom nozzle, the control rod guide thimbles, fuel rods and the instrumentation tube having parallel axes extending along their elongated dimension, the instrumentation tube being adapted to receive an in-core instrumentation that extends along a substantial axial length of the instrumentation tube, the in-core instrumentation remaining fixed during reactor operation; and
   an instrumentation tube insert that extends within and substantially along the elongated dimension and over the substantial axial length of the instrumentation tube, the insert having an inside narrow-most diameter at a plurality of axial locations along the length of the insert that is adapted to closely approximate the outside diameter of the in-core instrumentation, the plurality of axial locations extending over the substantial axial length, so as to maintain the in-core instrumentation centered in the instrumentation tube when inserted, the inside narrow-most diameter being supported a fixed distance from an inside diameter of the instrumentation tube at spaced segmented locations along an interior and substantially along the elongated dimension of the instrumentation tube, the insert comprising a spiral spring and being adapted to center the in-core instrumentation over the substantial axial length of the instrumentation tube.

2. The nuclear fuel assembly of claim 1 wherein an outside diameter of the spring closely matches the inside diameter of the instrumentation tube and an inside diameter of the spring closely matches the outside diameter of the in-core instrumentation.

3. The nuclear fuel assembly of claim 1 wherein the spring has a first and second end and a central axial region and has a close pitch at the first and second end and a larger pitch in the central axial region sized to preclude snagging of the in-core instrument.

4. The nuclear fuel assembly of claim 3 wherein the spring has an approximately one inch (2.54 cm) pitch in the central axial region.

5. The nuclear fuel assembly of claim 1 wherein the insert further comprises an instrument thimble tube having an outside diameter that closely approximates an inside diameter of the spring and the instrument thimble tube having an inside diameter that closely approximates the outside diameter of the in-core instrumentation.

6. The nuclear fuel assembly of claim 5 wherein the instrument thimble tube has an end that flairs, radially outward to retain the spring.

7. A nuclear reactor fuel assembly comprising;
   a top nozzle;
   a bottom nozzle;
   a plurality of elongated control rod guide thimbles respectively attached at a first end to the top nozzle and at a second end to the bottom nozzle;
   a plurality of elongated fuel rods supporting fissile material there within, the fuel rods extending parallel to the control rod guide thimbles, between the top nozzle and the bottom nozzle;
   a plurality of transverse grids arranged in a spaced tandem array between the top nozzle and the bottom nozzle, the grids respectively forming a lattice to latterly support the fuel rods in a spaced orderly array, the grids being attached to and supported axially by the control rod guide thimbles;
   at least one elongated instrumentation tube extending and captured between the top nozzle and the bottom nozzle, the control rod guide thimbles, fuel rods and the instrumentation tube having parallel axes extending along their elongated dimension, the instrumentation tube being adapted to receive an in-core instrumentation that extends along a substantial axial length of the instrumentation tube, the in-core instrumentation remaining fixed during reactor operation; and
   an instrumentation tube insert that extends within and substantially along the elongated dimension and over the substantial axial length of the instrumentation tube, the insert having an inside narrow-most diameter at a plurality of axial locations along the length of the insert that is adapted to closely approximate the outside diameter of the in-core instrumentation, the plurality of axial locations extending over the substantial axial length, so as to maintain the in-core instrumentation centered in the instrumentation tube when inserted, the inside narrow-most diameter being supported a fixed distance from an inside diameter of the instrumentation tube at spaced segmented locations along an interior and substantially along the elongated dimension of the instrumentation tube, the insert being adapted to center the in-core instrumentation and wherein the insert has an oval cross section at a plurality of locations along its axial dimension wherein a major outside diameter of the oval cross section approximates the inside diameter of the instrumentation tube and wherein a minor inside diameter of the oval cross section substantially approximates the outside diameter of the in-core instrumentation.

8. The nuclear fuel assembly of claim 7 wherein the major diameter of the oval cross section is rotated relative to the axis of the instrumentation tube at different elevations along the axis of the instrumentation tube.

9. The nuclear fuel assembly of claim 8 wherein the rotation is 90 degrees between adjacent oval cross sections.

10. The nuclear fuel assembly of claim 1 wherein inside narrow-most diameter of the insert is approximately equal to or greater than 0.266 in. (.676 cm).

11. The nuclear fuel assembly of claim 7 wherein the inside narrow-most diameter of the insert is approximately equal to or greater than 0.266 in. (.676 cm).

* * * * *